(12) United States Patent
Farooq et al.

(10) Patent No.: US 11,541,834 B2
(45) Date of Patent: Jan. 3, 2023

(54) FLOOR MOUNTED AIRBAG

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/082,132

(22) Filed: Oct. 28, 2020

(65) Prior Publication Data

US 2022/0126775 A1  Apr. 28, 2022

(51) Int. Cl.
*B60R 21/20* (2011.01)
*B60R 21/231* (2011.01)
*B60N 2/14* (2006.01)
*B62D 25/20* (2006.01)
*A61G 3/08* (2006.01)

(52) U.S. Cl.
CPC .............. *B60R 21/20* (2013.01); *B60N 2/14* (2013.01); *B60R 21/231* (2013.01); *B62D 25/2009* (2013.01); *A61G 3/0808* (2013.01)

(58) Field of Classification Search
CPC ....... B60R 21/20; B60R 21/231; B60R 21/16; B60N 2/14; B60N 2/143; B62D 25/2009
USPC ...................................................... 280/730.1
See application file for complete search history.

(56) References Cited

U.S. PATENT DOCUMENTS

| | | | |
|---|---|---|---|
| 9,744,932 B1 | 8/2017 | Faruque et al. | |
| 10,343,642 B2 | 7/2019 | Faruque et al. | |
| 10,399,529 B2 | 9/2019 | Spahn et al. | |
| 2022/0063546 A1* | 3/2022 | Jaradi | B60R 21/2334 |

FOREIGN PATENT DOCUMENTS

WO   2019168883 A1   6/2019

\* cited by examiner

*Primary Examiner* — Keith J Frisby
(74) *Attorney, Agent, or Firm* — Frank A. MacKenzie; Bejin Bieneman PLC (57) ABSTRACT

A vehicle includes a floor and an occupant seating area above the floor. An airbag is fixed to the floor and is inflatable upwardly from the floor to an inflated position. At least a portion of the airbag in the inflated position extends endlessly around the occupant seating area.

20 Claims, 9 Drawing Sheets

FLOOR MOUNTED AIRBAG

BACKGROUND

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate during the operation of the vehicle. This may allow the occupants of the seats to face each other and to interact. This may also allow all of the occupants to relax, interact with one another, and focus on vehicle amenities. Likewise, an occupant may be seated in a personal mobility device, e.g., a wheelchair, scooter, etc., that may be positioned in the vehicle in multiple directions. There remains an opportunity to design the vehicle to take into account the positioning of occupants facing in multiple directions.

DETAILED DESCRIPTION

A vehicle includes a floor, an occupant seating area above the floor, and an airbag fixed to the floor and inflatable upwardly from the floor to an inflated position. At least a portion of the airbag in the inflated position extending endlessly around the occupant seating area.

The vehicle may include a seat in the occupant seating area, the seat being rotatable relative to the floor about an axis that extends through the floor.

The vehicle may include a seat in the occupant seating area, the floor including a panel and a platform rotatably supported by the panel, the seat and the airbag being fixed to the platform. The airbag is arranged in a generally circular shape on the platform in an uninflated position.

The airbag may include a cavity receiving the occupant seating area in the inflated position. The vehicle may include a seat in the occupant seating area, the seat including a seat back and a seat bottom extending in a seat-forward direction from the seat back, the cavity including an extension protruding in the seat-forward direction. The floor may include a panel and a platform rotatably supported by the panel, the seat and the airbag being fixed to the platform. The extension may extend in the seat-forward direction beyond the platform. The floor may include a panel and a platform rotatably supported by the panel, the seat and the airbag being fixed to the platform, wherein the airbag includes tubes below the cavity extending from the platform to the extension. The airbag may include an upper pillow above the extension. The airbag may include a panel extending along the cavity in a frusto-cylindrical shape from one side of the extension to the other side of the extension. The floor may be designed to lock a personal mobility device and the extension is designed to receive legs of an occupant of a personal mobility device.

The assembly may include a seat fixed to the platform in the occupant seating area. The airbag may be arranged in a generally circular shape around the seat on the platform in an uninflated position.

The assembly may include seat fixed to the platform in the occupant seating area. The airbag may be arranged in a generally circular shape around the seat on the platform in an uninflated position.

The airbag may include a cavity receiving the occupant seating area in the inflated position, the airbag including an extension protruding from the cavity. The assembly may include a seat fixed to the platform in the occupant seating area, the seat including a seat back and a seat bottom extending in a seat-forward direction from the seat back, the extension protruding in the seat-forward direction relative to the seat bottom. The extension may extend in the seat-forward direction beyond the platform. The airbag may include tubes below the cavity extending from the platform to the extension. The platform may be designed to lock a personal mobility device and the extension may be designed to receive the legs of an occupant of a personal mobility device.

With reference to the Figures, wherein like numerals indicate like parts throughout the several views, a vehicle 10 includes a floor 12 and an occupant seating area 14 above the floor 12. An airbag 16 is fixed to the floor 12 and is inflatable upwardly from the floor 12 to an inflated position. At least a portion of the airbag 16 in the inflated position extends endlessly around the occupant seating area 14.

Figure 1:
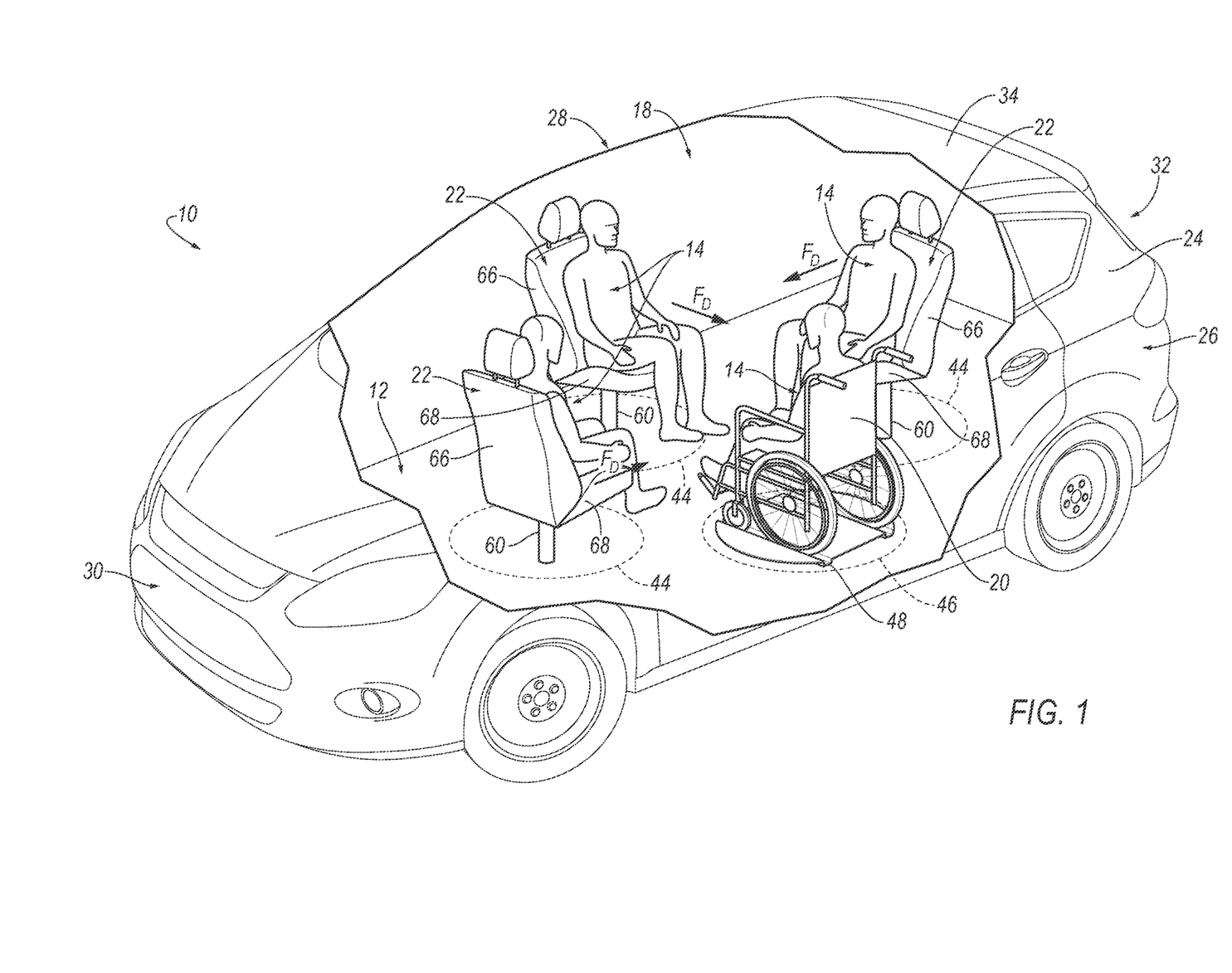
FIG. 1 is a perspective view of a vehicle including airbags in an uninflated position fixed to a floor and a personal mobility device.
Figure 2:
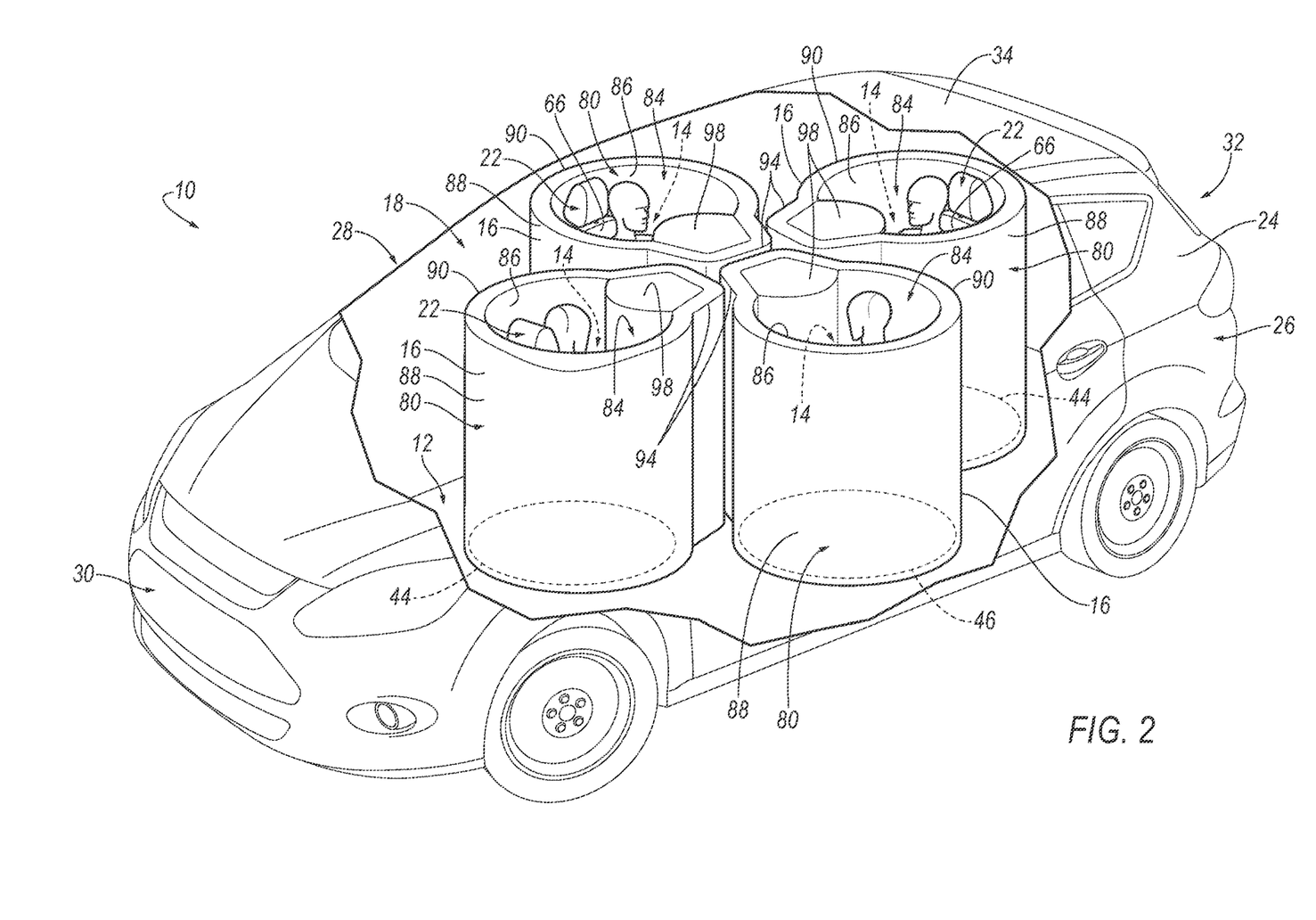
FIG. 2 is the perspective view of FIG. 1 with the airbags in an inflated position.

During a vehicle impact, the airbag 16 is inflated upwardly from the floor 12 from an uninflated position (FIG. 1) to the inflated position (FIG. 2). Since at least a portion of the airbag 16 in the inflated position extends endlessly around the occupant seating area 14, at least a portion of the airbag 16 extends endlessly around an occupant in the occupant seating area 14. Because at least a portion of the airbag 16 extends endlessly around the occupant seating area 14, the airbag 16 can control occupant kinematics regardless of the direction of the vehicle impact. As one example, in a frontal vehicle impact, the occupant is urged vehicle-forward and the airbag 16 controls the occupant kinematics. As a second example, in a side impact, the occupant is urged cross-vehicle and the airbag 16 controls the occupant kinematics.

Figure 3:
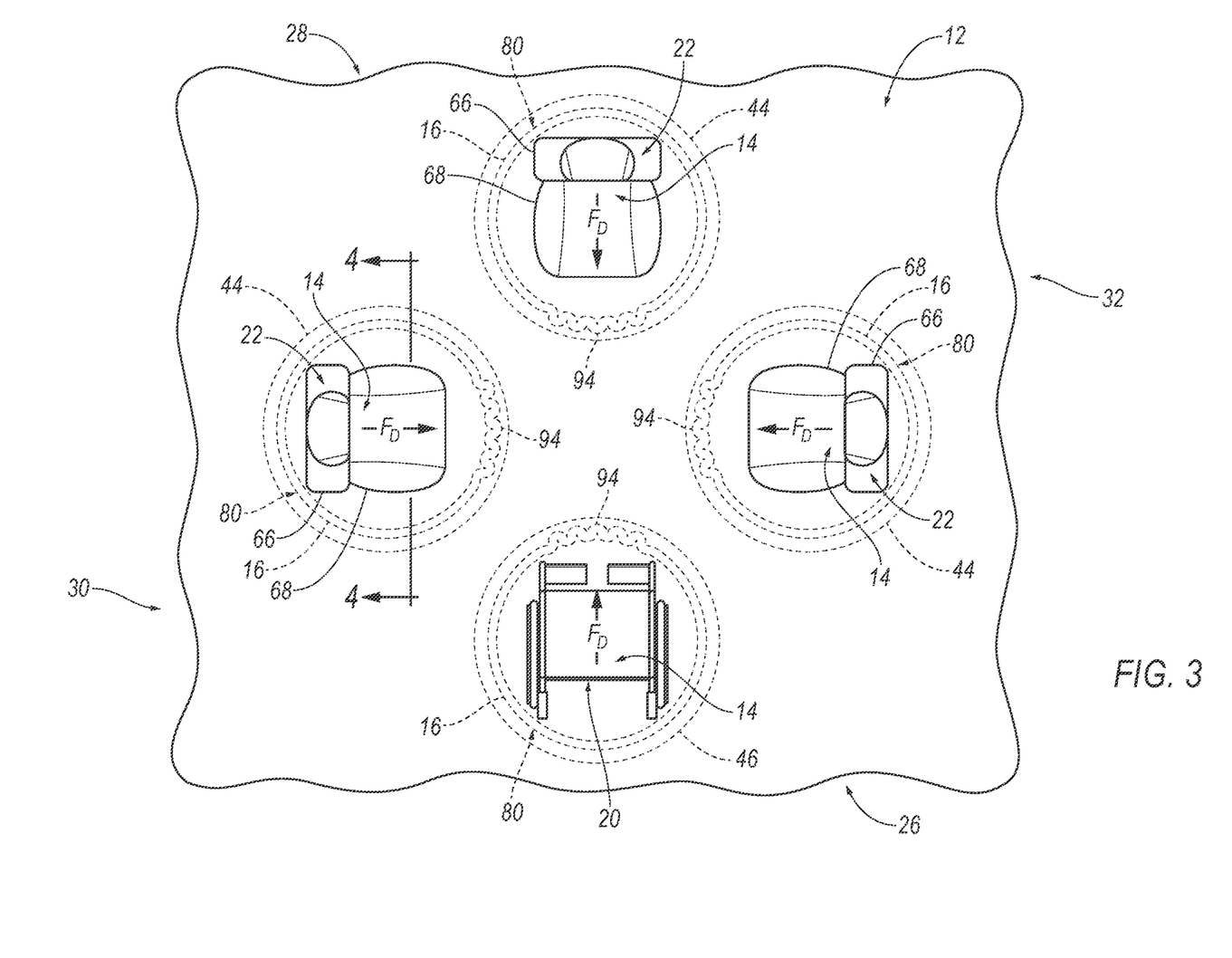
FIG. 3 is a top view of the vehicle.

With reference to FIGS. 1-3, the occupant seating area 14 is an area in a passenger compartment 18 of the vehicle 10 that is occupied by a seated occupant during operation of the vehicle 10. The occupant seating area 14 may be designed to house a seat 22 or a personal mobility device 20, as described further below. The vehicle 10 may include more than one occupant seating area 14 with at least one occupant seating area 14 designed to house one seat 22 or one personal mobility device 20. The vehicle 10 may be reconfigured to change the occupant seating area 14 between one designed to house the seat 22 and one designed to house the personal mobility device 20. The occupant seating area 14 may extend from the floor 12 to an uppermost point on the seat 22 or the personal mobility device 20. For example, the occupant seating area 14 may extend from the floor 12 to the uppermost point on an occupant seated in the occupant seating area 14.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle 10. In other words, the vehicle 10 may be autonomously operated such that the vehicle 10 may be driven without constant attention from a driver, i.e., the vehicle 10 may be self-driving without human input.

With reference to FIG. 1, the vehicle 10 may include a body 24. The body 24 may have a unibody construction, i.e., the body 24 is unitary with a vehicle frame, a body-on-frame construction, i.e., the body 24 and the frame are separate components with the body 24 supported on the frame, or any other suitable construction. The body 24 may be of any suitable material, e.g., steel, aluminum, composite, fiber-reinforced plastic, etc.

With reference to FIGS. 1-2, the body 24 may define the passenger compartment 18 to house occupants, if any, of the vehicle 10. The passenger compartment 18 includes a left side 26 and a right side 28 spaced cross-vehicle, e.g., at doors of the vehicle 10. The passenger compartment 18 includes a front end 30 and a rear end 32 with the front end 30 being in front of the rear end 32 during forward movement of the vehicle 10. The occupant seating area 14 is in the passenger compartment 18. The passenger compartment 18 may house one or more seats 22 and/or personal mobility devices 20.

The body 24 includes the floor 12 and may include a roof 34 above the floor 12. In such examples, the passenger compartment 18 extends from the floor 12 to the roof 34. The floor 12 may define a lower boundary of the passenger compartment 18. The roof 34 may define an upper boundary of the passenger compartment 18. The floor 12 and/or the roof 34 may extend cross-vehicle from the left side 26 to the right side 28 of the passenger compartment 18 and may extend vehicle-fore-and-aft from the front end 30 to the rear end 32 of the passenger compartment 18.

Figure 4:
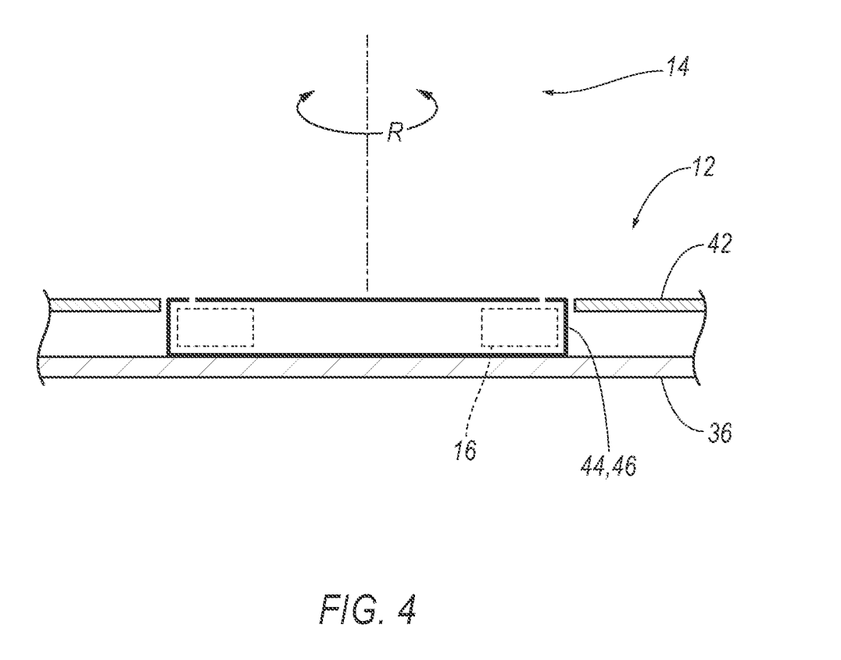
FIG. 4 is a cross-sectional view of Section 4-4 in FIG. 3, of the floor including the airbag in the uninflated position.

With reference to FIG. 4, the floor 12 may include a panel 36. The panel 36 may, for example, extend from the left side 26 to the right side 28 of the passenger compartment 18 and from the front end 30 to the rear end 32 of the passenger compartment 18. The panel 36 may be, for example, sheet metal, sheet-molded composite, etc. The floor 12 may include a plurality of cross-beams that support the panel 36.

With reference to FIGS. 1-4, the floor 12 may include a platform 44, 46 rotatably supported by the panel 36. As described further below, in such an example, the airbag 16 is supported by the platform 44, 46 and rotates with the platform 44, 46 relative to the panel 36.

The platform 44, 46 is rotatably supported by the panel 36. Specifically, the weight of the platform 44, 46 rests on the panel 36 and the platform 44, 46 is rotatable relative to the panel 36. The platform 44, 46 may be rotatable about a rotational axis R that extends through the panel 36 and through the roof 34. The rotational axis R may be vertical.

The platform 44, 46 may be rotatably engaged with the panel 36 in any suitable fashion and the rotational position of the platform 44, 46 relative to the panel 36 may be controlled in any suitable fashion. For example, the platform 44, 46 and/or the panel 36 may include nested rings that rotate relative to each other. In such an example, the platform 44, 46 may be manually moved relative to the panel 36 and a lock may selectively lock/unlock the platform 44, 46 and the panel 36. The lock may be mechanically operated, e.g., with a lever, cable, Bowden cable, etc., or may be electronically operated, e.g., with a switch, solenoid, etc. As another example, a motor may selectively rotate the platform 44, 46 relative to the panel 36. In such an example, a human-machine interface may allow an occupant to control the operation of the motor. The motor may support the platform 44, 46 on the panel 36 and/or the motor may be supported on the panel 36.

The platform 44, 46 may be connected, i.e., directly or indirectly, to the panel 36. The platform 44, 46 may contact the panel 36 or may be spaced from the panel 36 by intermediate components, e.g., rings, motor, etc.

With reference to FIGS. 1, 2, and 4, the floor 12 may include upholstery, e.g., carpeting, trim, etc., supported on the platform 44, 46 and/or the panel 36. The floor 12 may include a covering 42 that conceals panel 36 and the platform 44, 46 at the point of relative movement between the platform 44, 46 and the panel 36. For example, the floor 12 may include overlapping carpet, flexible polymeric trim, horsehair, etc., that conceals the point of relative movement without inhibiting relative movement of the platform 44, 46 relative to the panel 36.

The floor 12 may be designed to support at least one seat 22 and/or at least one personal mobility device 20. Specifically, the platform 44, 46 may be designed to support at least one seat 22 and/or at least one personal mobility device 20. Two examples of the platform 44, 46, also referred to as a seat platform 44 and a personal mobility platform 46 are shown in FIG. 1 with the seat platform 44 designed to support one seat 22 and with the personal mobility platform 46 designed to support one personal mobility device 20. Specifically, in the example of the seat platform 44, one seat 22 may be mounted to the seat platform 44 and, in such an example, the seat 22 rotates with the seat platform 44 and the airbag 16 relative to the panel 36. The personal mobility platform 46 is designed to support one personal mobility device 20 and, in such an example, a personal mobility device 20 supported on the personal mobility platform 46 rotates with the personal mobility platform 46 and the airbag 16 relative to the panel 36. The platform 44, 46 may rotate relative to the panel 36 at any suitable angle, e.g., between fixed angles, endlessly in 360 degrees, etc.

The floor 12 may include more than one platform 44, 46, i.e., one or more platforms 44, 46. In the example shown in the Figures, the floor 12 includes four platforms 44, 46. The floor 12 may include only seat platforms 44 (i.e., no personal mobility platforms 46), only personal mobility platforms 46 (i.e., no seat platforms 44), or a combination of one or more seat platforms 44 and one or more personal mobility platforms 46. At any time, e.g., at the time of assembly or afterward by a service technician, the seat platform 44 and the personal mobility platform 46 may be interchanged at any selected location in the vehicle 10.

Figure 7:
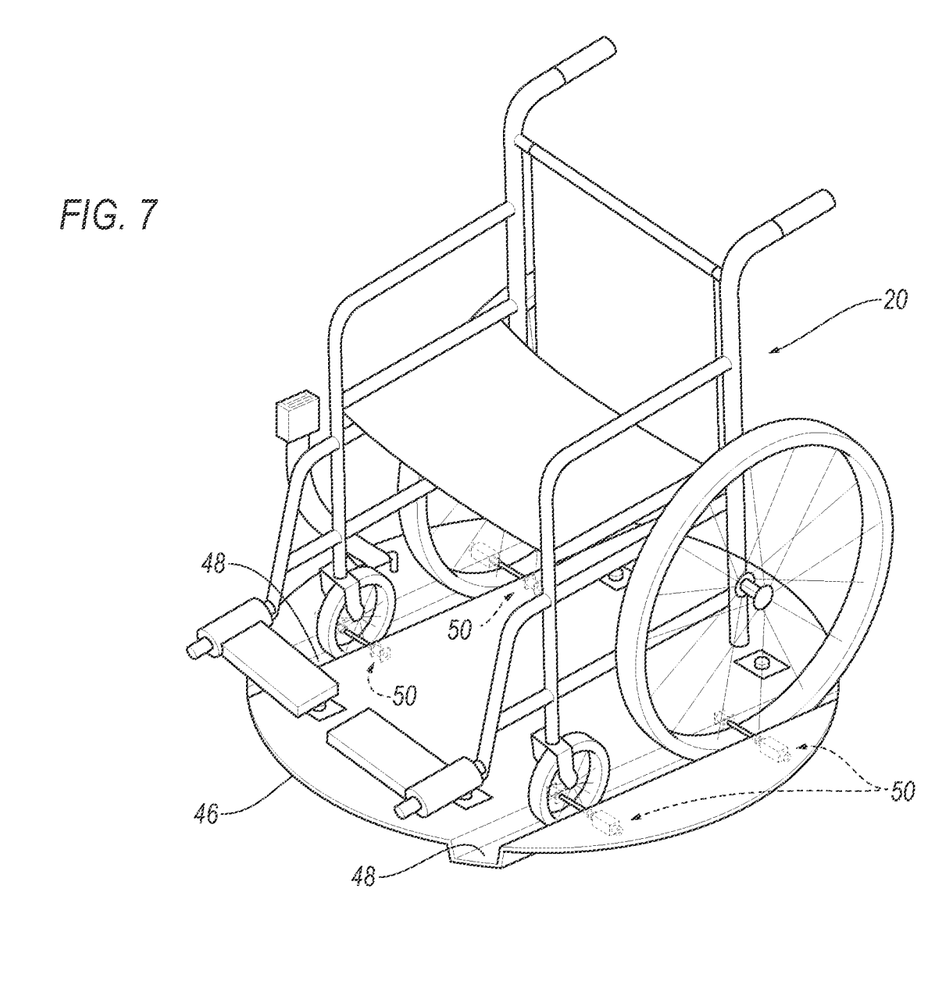
FIG. 7 is a perspective view of a personal mobility platform including a personal mobility device.

With reference to FIG. 7, the floor 12 may be designed to lock one or more personal mobility devices 20. Specifically, the personal mobility platform 46 may be designed to lock the personal mobility device 20. For example, the personal mobility platform 46 may include one or more channels 48 to engage wheels of the personal mobility device 20 and/or one or more latches 50 may be supported by the personal mobility platform 46 to releasably engage wheels of the personal mobility device 20.

With continued reference to FIG. 7, the channels 48 of the personal mobility platform 46 are designed to engage wheels of the personal mobility device 20. Specifically, the channels 48 are sized and shaped to receive wheels of the personal mobility device 20 such to resist lateral movement of the personal mobility device 20 during operation of the vehicle 10.

The channels 48 are spaced from and parallel to each other. The channels 48 may be elongated along the personal mobility platform 46. For example, as shown in the Figures, the channels 48 may be elongated along the entire length of the personal mobility platform 46, i.e., from one end of the personal mobility platform 46 to the other. In another example, the channels 48 may be elongated only along a portion of the personal mobility platform 46. The channels 48 are on the top surface of the personal mobility platform 46, i.e., the channels 48 face toward the passenger compartment 18 to allow wheels of the personal mobility device 20 to roll into the channels 48.

Any suitable number of latches 50, i.e., one or more, may be supported by the personal mobility platform 46 to secure the wheels of the personal mobility device 20 and limit the movement of the personal mobility device 20 in the channels 48. For example, the number of latches 50 may be equal to the number of wheels of the personal mobility device 20. In the example shown in the Figures, the personal mobility platform 46 includes four latches 50, one latch 50 for each of the four wheels of the personal mobility device 20. In such an example, two latches 50 are spaced from each other adjacent the first channel 48 and two latches 50 are spaced from each other adjacent the second channel 48.

The latches 50 are moveable between an unlatched position and a latched position. When the latches 50 are in the unlatched position, the latches 50 are retracted from the channels 48, i.e., the latch 50 is drawn away from the channel 48 when the latch 50 is in the unlatched position. In the unlatched position, the wheels of the personal mobility device 20 may be free to roll and/or move within the channels 48. When the latches 50 are in the latched position, the latches 50 are elongated across the channels 48 in the latched position. In the latched position, the wheels of the personal mobility device 20 are unable to roll and/or move within the channels 48.

In the latched position, the latches 50 are designed to extend through the wheel of a personal mobility device 20 adjacent the latch 50. The latches 50 extend across the channels 48 and through the wheel of the personal mobility device 20 when in the latched position. The wheel of the personal mobility device 20 may include spokes, as shown in the Figures. The latch 50 limits the rolling and movement of the wheels of the personal mobility device 20 by extending through the wheel, i.e., between the spokes, and across the channels 48.

The latches 50 may be electronic or manual. In the example shown in FIG. 7, the latch 50 is electronic. Specifically, the latch 50 in FIG. 7 includes a solenoid. The solenoid includes a body mounted to the personal mobility platform 46 and a post extendable from the body. The body of the solenoid may be disposed on the bottom surface of the personal mobility platform 46, i.e., the body of the solenoid may be between the personal mobility platform 46 and the panel 36.

The personal mobility platform 46 may define a pair of holes in the channels 48 positioned adjacent the post and body of the solenoid. In the unlatched position, the post of the solenoid is retracted from the channel 48 and is retracted from at least one of the holes in the unlatched position. The wheels of the personal mobility device 20 are free to roll/move in the channel 48 of the personal mobility platform 46. The personal mobility platform 46 may include a pair of holes in the channels 48 that correspond to each of the number of latches 50 supported by the personal mobility platform 46. In other words, each latch 50 has a pair of holes adjacent the latch 50.

In the latched position, the post is elongated across the channel 48. The post extends from the body of the solenoid, through both the holes, and is elongated across the channel 48. Specifically, the post of the solenoid extends from the body of the solenoid, through both holes, and across the top surface of the panel 36 to the latched position. The post of the solenoid is designed to extend through a wheel of a personal mobility device 20 when the latch 50 is in the latched position. In the latched position, the movement of the wheel in the channel 48 of the panel 36 is limited because the post of the solenoid passes through the wheel of the personal mobility device 20.

The personal mobility device 20 may be of any suitable type that supports a seated occupant. The personal mobility device 20 transports the seated occupant outside of the vehicle 10 and moves the seated occupant in the passenger compartment 18 during ingress to and egress from the vehicle 10. The personal mobility device 20 supports the seated occupant in the passenger compartment 18 during operation of the vehicle 10. The personal mobility device 20 may include wheels, as described above. As examples including wheels, the personal mobility device 20 may be a wheelchair or a scooter. As another example, the personal mobility device 20 may include a continuous track. In such an example, the continuous track is in contact with ground and personal mobility device 20 may include wheels that transmit torque to the continuous track.

Figure 5A:
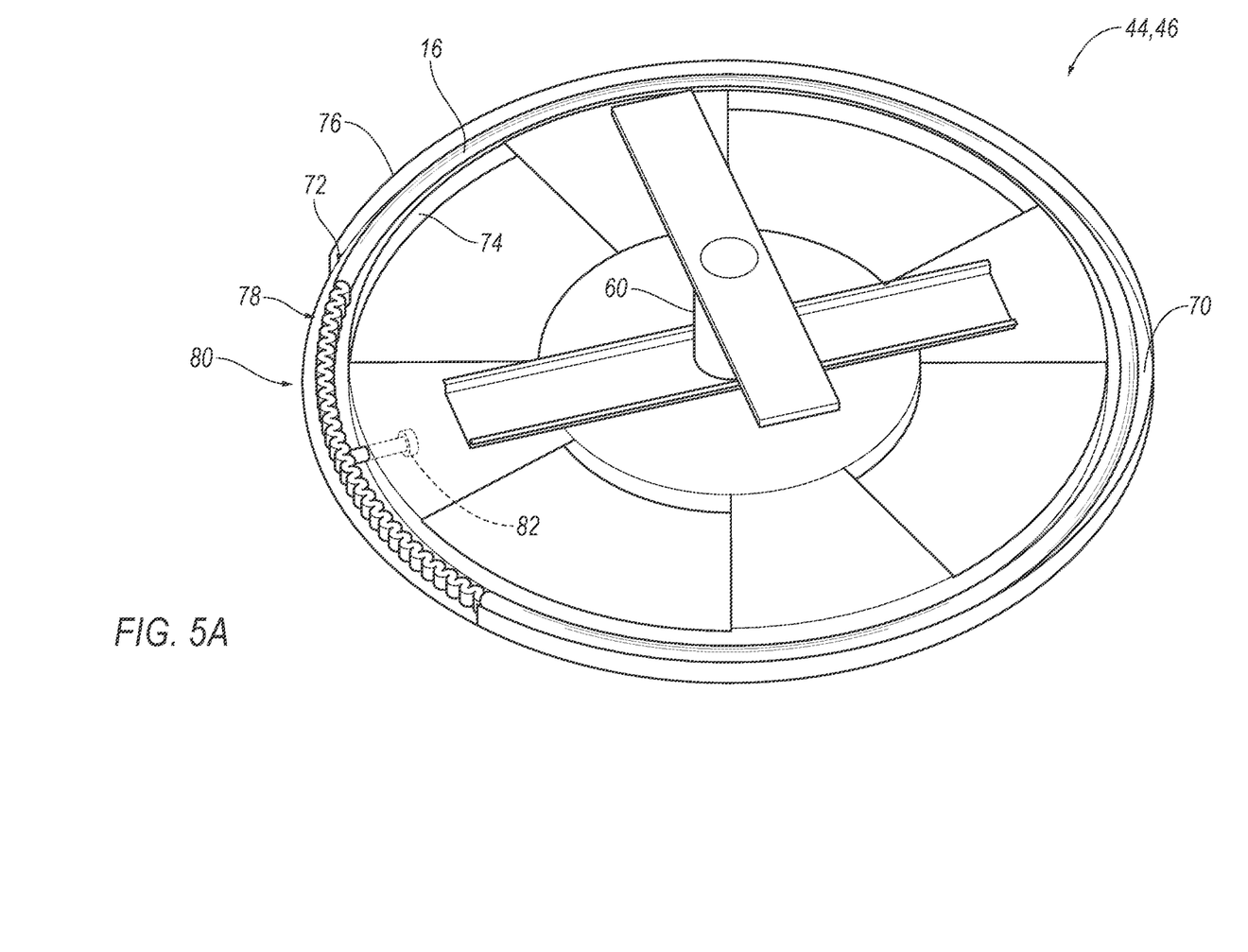
FIG. 5A is a perspective view of a platform including the airbag in the uninflated position.
Figure 5B:
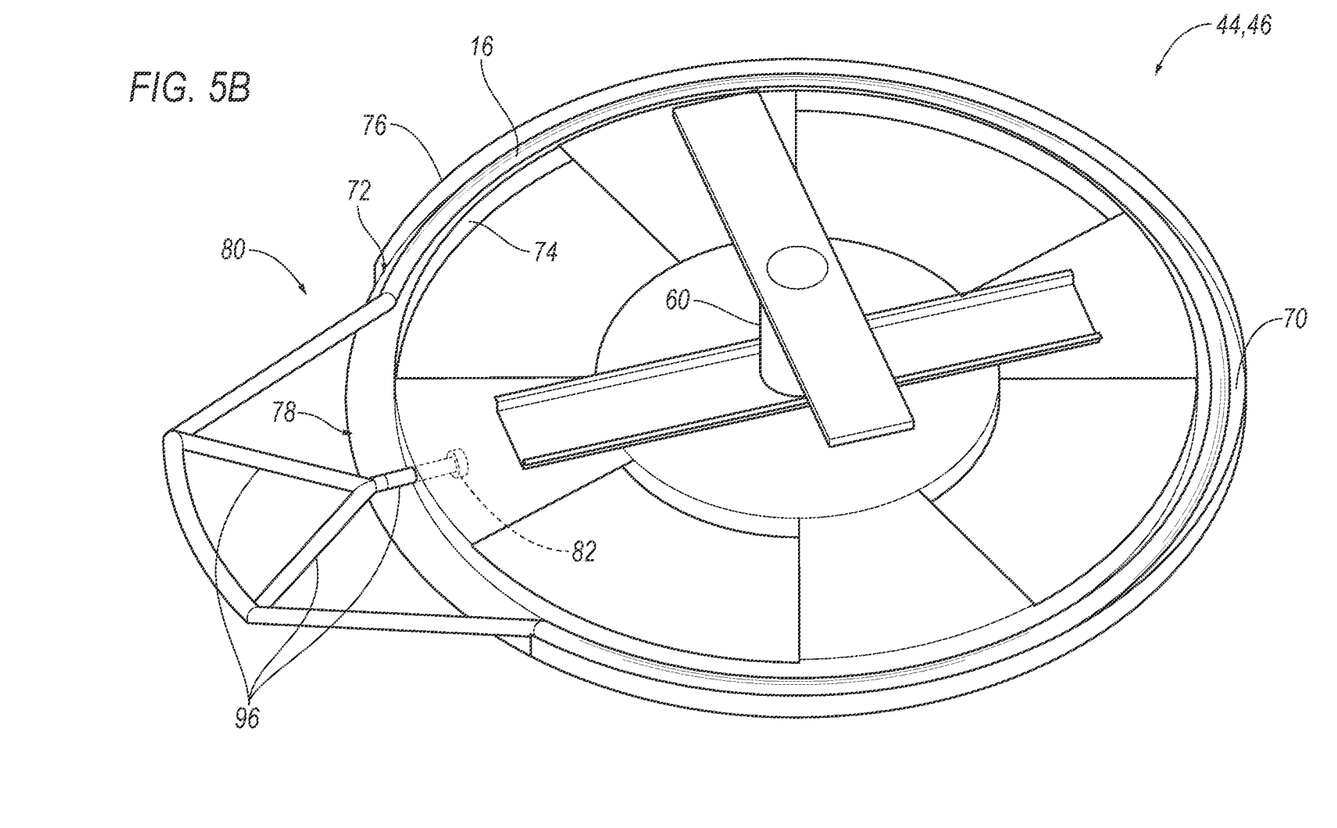
FIG. 5B is the perspective view of FIG. 5A including tubes of the airbag in the inflated position.
Figure 5C:
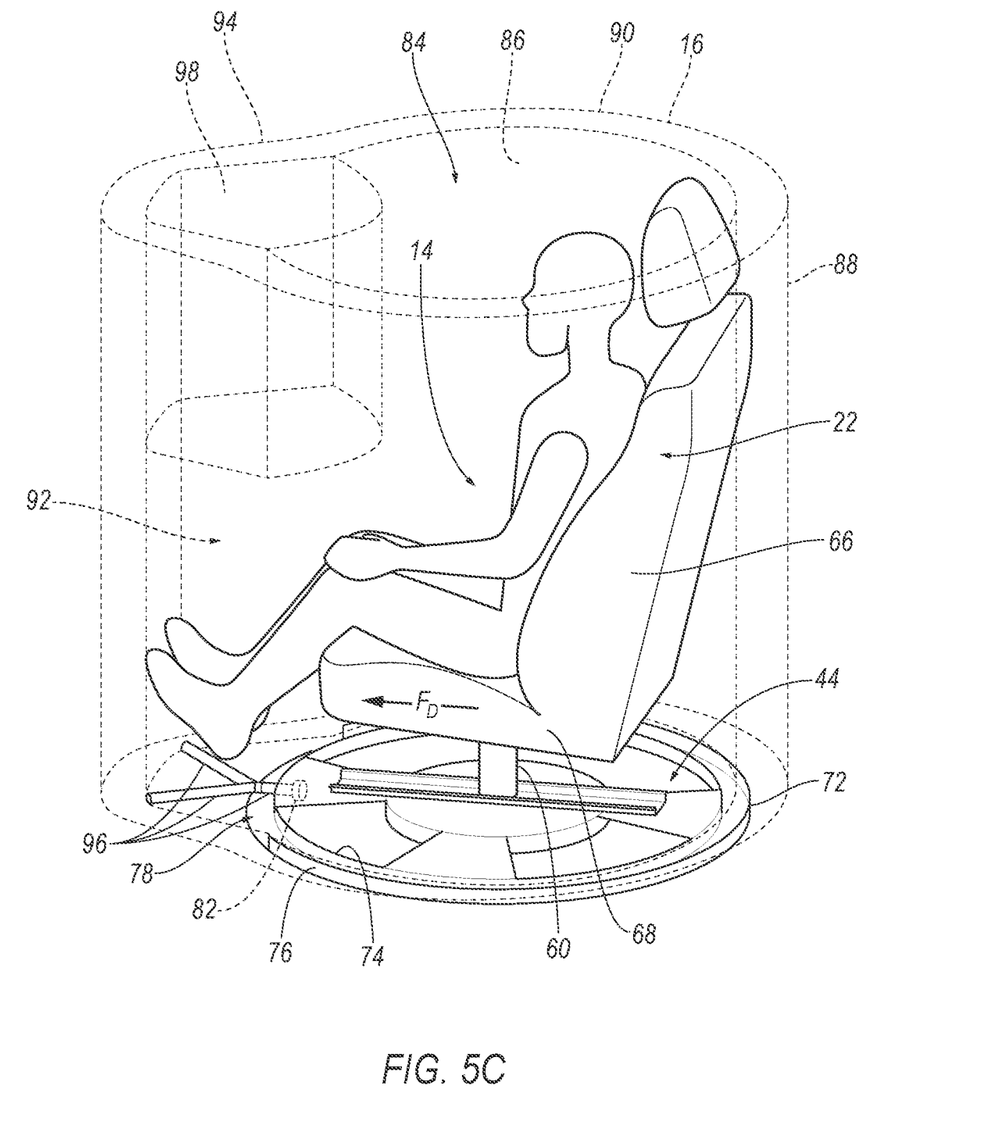
FIG. 5C is a perspective view of the platform 44, 46 including an occupant and a seat and the airbag in the inflated position.

The floor 12 may be designed to support one or more seats 22. For example, the seat platform 44 may be designed to support the seat 22. In such an example, the seat 22 is fixed to the seat platform 44, i.e., rotates as a unit with the seat platform 44. As shown in FIGS. 5A-C, the platform 44, 46 may include a seat mount 60 that is fixed to the rest of the platform 44, 46 and is fixed to the seat 22. The seat 22 may include a seatback 66, a seat bottom 68, and a head restraint (not numbered). The seat bottom 68 may be supported by the seat platform 44. The seatback 66 may be supported by the seat bottom 68 and may be stationary or movable relative to the seat bottom 68. Specifically, the seat bottom 68 extends in a seat-forward direction $F_D$ from the seatback 66. The head restraint may be supported by the seatback 66 and may be stationary or movable relative to the seatback 66. The seatback 66, the seat bottom 68, and the head restraint may be adjustable in multiple degrees of freedom. The seat 22 is in the occupant seating area 14.

The occupant seating area 14 is an area in the passenger compartment 18 of the vehicle 10 that is occupied by a seated occupant, e.g. seated in the seat 22 or in a personal mobility device 20, during operation of the vehicle 10. With reference to FIGS. 1-3, the occupant seating area 14 is above the floor 12. The platform 44, 46, as an example, defines the occupant seating area 14. In such an example, the platform 44, 46 supports the seat 22 or the personal mobility device 20 and, accordingly, the occupant seating area 14 is above the platform 44, 46.

The platform 44, 46 may include a groove 72 that houses the airbag 16 in the uninflated position. The groove 72 extends around the occupant seating area 14 at the floor 12. The platform 44, 46 may include an inner wall 74 and an outer wall 76 defining the groove 72 therebetween. The platform 44, 46 may have a bottom wall 70 extending from the inner wall 74 to the outer wall 76 and supporting the airbag 16. The inner wall 74 may be endless and the outer wall 76 may include an opening 78. In other words, the groove 72 may be open-faced to allow for extension of the airbag 16 in the inflated position, as described further below. The groove 72 may be circular. Specifically, the inner wall 74 may be circular and the outer wall 76 may be a part of a circle. In such an example, the opening 78 may extend along an arc of the outer wall 76, e.g., along 20-45 degrees.

The vehicle 10 includes an airbag assembly 80. The airbag assembly 80 may include the airbag 16 and an inflator 82. The airbag assembly 80 may include an airbag housing. The inflator 82 inflates the airbag 16 to the inflated position, as described further below. In an example in which the airbag assembly 80 includes the airbag housing, the airbag 16 is supported by the airbag housing. The airbag housing houses the airbag 16 in the uninflated position and supports the airbag 16 in the inflated position. The airbag 16 may be rolled and/or folded to fit within the airbag housing in the uninflated position. The airbag housing may be of any suitable material, e.g., a rigid polymer, a metal, a composite, or a combination of rigid materials.

Figure 6:
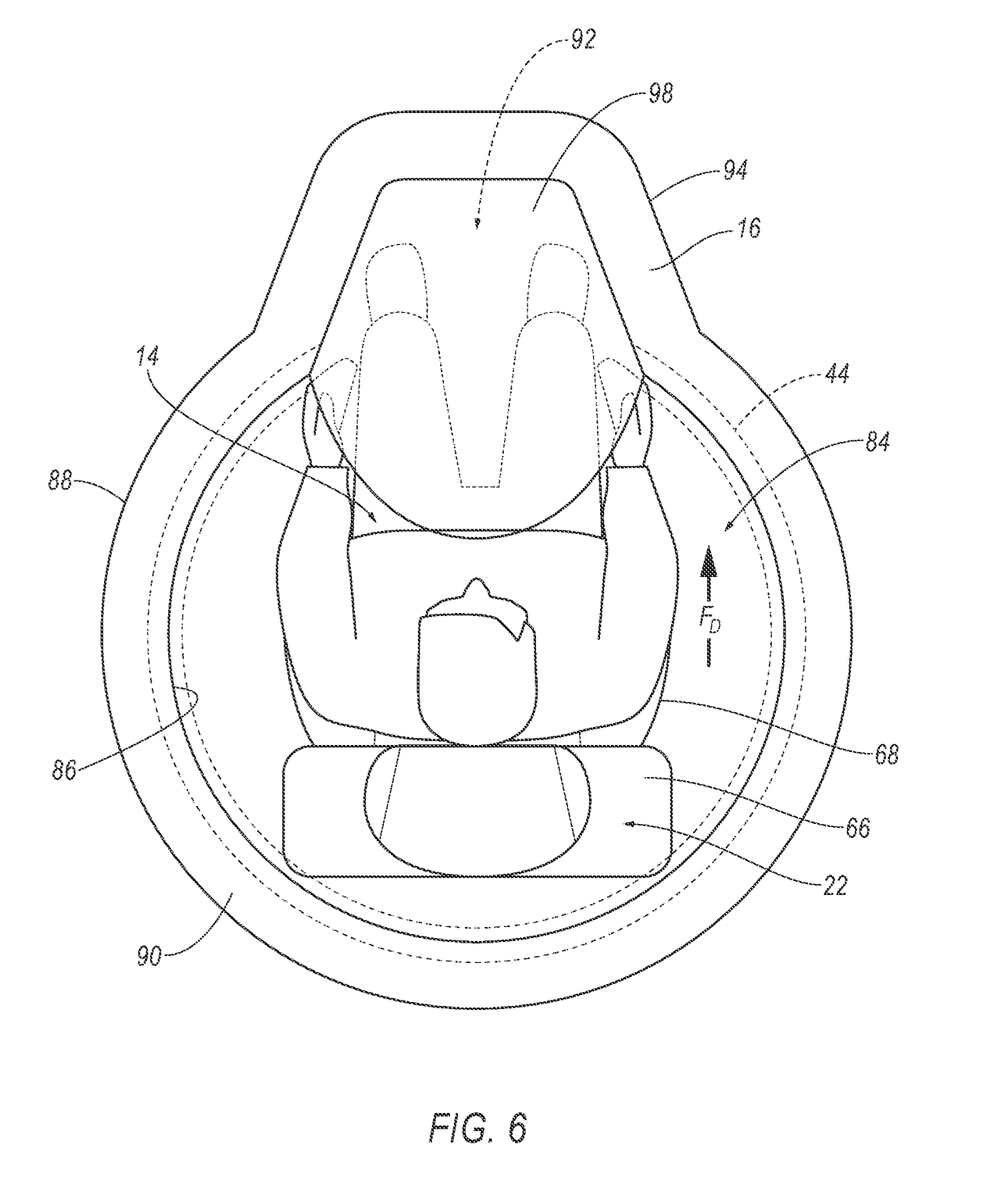
FIG. 6 is a top view of FIG. 5C.

With reference to FIGS. 4-6, the airbag 16 is fixed to the floor 12. Specifically, the airbag 16 is fixed to the platform 44, 46. The airbag 16 rotates with the platform 44, 46 relative to the panel 36. As an example, the airbag 16 is directly connected to the platform 44, 46, e.g., with fasteners (not shown). The airbag 16 is disposed in the groove 72 of the platform 44, 46, i.e., between the inner wall 74 and the outer wall 76. The airbag 16 may be supported on the bottom of the platform 44, 46 in the groove 72.

The airbag 16 is arranged in a generally circular shape on the platform 44, 46 in the uninflated position. Specifically, as set forth above, the groove 72 of the platform 44, 46 is circular and the airbag 16 fits the circular shape and size of the groove 72. In the example in which the platform 44, 46 is the seat platform 44, the airbag 16 is arranged in the generally circular shape around the seat 22 on the platform 44, 46 in the uninflated position. In the example in which the platform 44, 46 is the personal mobility platform 46, the airbag 16 is arranged in the generally circular shape around the personal mobility device 20 on the platform 44, 46 in the uninflated position. In the inflated position, the airbag 16 has the circular shape at the platform 44, 46 and extends upwardly from the platform 44, 46.

The airbag 16 is inflatable upwardly from the floor 12 to the inflated position, as shown in FIGS. 2 and 5C. Specifically, the airbag 16 is inflatable toward the occupant seating area 14 to the inflated position. The airbag 16 may have the shape of, for example, at least a part of a hollow cylinder, as described further below.

The airbag 16 defines a cavity 84 receiving the occupant seating area 14 in the inflated position. The airbag 16 extends around the cavity 84 and around the occupant seating area 14. Specifically, the airbag 16 includes an inner panel 86 facing the cavity 84 in the inflated position. The inner panel 86 extends around the cavity 84 and the occupant seating area 14. The inner panel 86 may be in the shape of at least part of a cylinder, as described further below. The airbag 16 includes an outer panel 88 connected to the inner panel 86 and defining an inflation chamber therebetween.

At least a portion of the airbag 16 in the inflated position extends endlessly around the occupant seating area 14. Specifically, at least a portion of the airbag 16 is endless around the occupant seating area 14 in a generally horizontal plane. In the example shown in the Figures, the airbag 16 includes an upper edge 90 and the airbag 16 extends endlessly around the occupant seating area 14 continuously from the platform 44, 46 to the upper edge 90. In other words, in the example shown in the Figures, the airbag 16 surrounds the entire circumference of the occupant seating area 14. The upper edge 90 may be above the uppermost point of the seat 22 and above the uppermost point of the personal mobility device 20. Specifically, the upper edge 90 may be above the head of the occupant seated in the occupant seating area 14. As another example, only a portion of the airbag 16 may extend endlessly around the occupant seating area 14 with other portions of the airbag 16 extending partly around the occupant seating area 14, e.g., at the feet of the occupant, at the head of the occupant, etc.

Since at least a portion of the airbag 16 extends endlessly around the occupant seating area 14, at least a portion of the airbag 16 in the inflated position extends around the occupant in the occupant seating area 14, i.e., the occupant on the seat 22 or the occupant on the personal mobility device 20. At least the portion of the airbag 16 that extends endlessly around the occupant seating area 14 is positioned to be impacted by the occupant in the occupant seating area 14 in the event of a vehicle impact. Since at least a portion of the airbag 16 extends endlessly around the occupant seating area 14, in the event of a vehicle impact, the airbag 16 will control the kinematics of the occupant in any direction of movement of the occupant resulting from the vehicle impact. Specifically, regardless of the direction of vehicle impact and regardless of the rotational position of the platform 44, 46, the airbag 16 will control the kinematics of the occupant. In other words, the airbag 16 provides omnidirectional kinematic control.

At least a portion of the inner panel 86 extends endlessly around the occupant seating area 14. At least a portion of the inflation chamber extends endlessly around the occupant seating area 14. In the example shown in the Figures, the inflation chamber extends endlessly around the occupant seating area 14.

At least a portion of the airbag 16 in the inflated position extends endlessly around the platform 44, 46. Specifically, as set forth above, and as shown in the Figures, the airbag 16 extends upwardly from the platform 44, 46 and may be circular. Specifically, the airbag 16 may be endless, e.g., circular, at the platform 44, 46 in the inflated position.

The airbag 16 may include a leg compartment 92 that protrudes from the rest of the airbag 16 in a seat-forward direction $F_D$. The inner panel 86, the outer panel 88, and the inflation chamber extend along the leg compartment 92. In other words, the leg compartment 92 is inflatable.

The cavity 84 may include an extension 94 protruding in the seat-forward direction $F_D$. Specifically, the extension 94 is in the leg compartment 92. The extension 94 receives the legs of the occupant. Specifically, the extension 94 is designed to receive legs of the occupant of the personal mobility device 20 and the legs of the occupant of the seat 22. The inner panel 86 may extend along the cavity 84 in a frusto-cylindrical shape from one side of the extension 94 to the other side of the extension 94.

The leg compartment 92 and the extension 94 may extend in the seat-forward direction $F_D$ beyond the platform 44, 46 in the inflated position. Specifically, the entire leg compartment 92 may be packaged on the platform 44, 46 in the uninflated position, i.e., in the groove 72, and may inflate in the seat-forward direction $F_D$ beyond the platform 44, 46. During inflation, the airbag 16 may inflate in the seat-forward direction $F_D$ beyond the platform 44, 46 through the opening 78 of the outer wall 76.

The airbag 16 may include tubes 96 below the cavity 84 extending from the platform 44, 46 to the extension 94. During inflation the tubes 96 straighten to extend the leg compartment 92 and open the extension 94. The tubes 96 are sized and shaped to force the leg compartment 92 in the seat-forward direction $F_D$ during inflation. This allows the airbag 16 to inflate seat-forward of the legs of the occupant. The tubes 96 force the leg compartment 92 seat-forward before the airbag 16 inflates upwardly in front of the occupant.

The airbag 16 may include an upper pillow 98 above the extension 94. Specifically, the upper pillow 98 is above the leg compartment 92 and is aligned with the thorax and head of the occupant in the seat 22 or the personal mobility device 20. The upper pillow 98 may be impacted by the head and/or thorax of the occupant and may control the kinematics of the head and/or the thorax. The inflation chamber at the upper pillow 98 is deeper in the seat-forward direction $F_D$ than the inflation chamber at the leg compartment 92. The inner panel 86 at the leg compartment 92 is seat-forward of the inner panel 86 at the upper pillow 98.

The airbag 16, specifically the inner panel 86 and the outer panel 88, may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The inflator 82 is in fluid communication with the inflation chamber of the airbag 16. The inflator 82 may be mounted to the platform 44, 46 and may rotate with the platform 44, 46 relative to the panel 36. The inflator 82 expands the airbag 16 with inflation medium, such as a gas, to move the airbag 16 from the uninflated position to the inflated position. The inflator 82 may be supported by any suitable component. For example, the inflator 82 may be supported by the housing. The inflator 82 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator 82 may be, for example, at least partially in the inflation chamber to deliver inflation medium directly to the inflation chamber or may be connected to the inflation chamber through fill tubes, diffusers, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a floor;
   an occupant seating area above the floor;
   an airbag fixed to the floor and inflatable upwardly from the floor to an inflated position; and
   at least a portion of the airbag in the inflated position extending endlessly around the occupant seating area.

2. The vehicle as set forth in claim 1, further comprising a seat in the occupant seating area, the seat being rotatable relative to the floor about an axis that extends through the floor.

3. The vehicle as set forth in claim 1, further comprising a seat in the occupant seating area, the floor including a panel and a platform rotatably supported by the panel, the seat and the airbag being fixed to the platform.

4. The vehicle as set forth in claim 3, wherein the airbag is arranged in a generally circular shape on the platform in an uninflated position.

5. The vehicle as set forth in claim 1, wherein the airbag includes a cavity receiving the occupant seating area in the inflated position.

6. The vehicle as set forth in claim 5, further comprising a seat in the occupant seating area, the seat including a seat back and a seat bottom extending in a seat-forward direction from the seat back, the cavity including an extension protruding in the seat-forward direction.

7. The vehicle as set forth in claim 6, wherein the floor includes a panel and a platform rotatably supported by the panel, the seat and the airbag being fixed to the platform.

8. The vehicle as set forth in claim 7, wherein the extension extends in the seat-forward direction beyond the platform.

9. The vehicle as set forth in claim 6, wherein the floor includes a panel and a platform rotatably supported by the panel, the seat and the airbag being fixed to the platform, wherein the airbag includes tubes below the cavity extending from the platform to the extension.

10. The vehicle as set forth in claim 6, wherein the airbag includes an upper pillow above the extension.

11. The vehicle as set forth in claim 6, wherein the airbag includes a panel extending along the cavity in a frusto-cylindrical shape from one side of the extension to the other side of the extension.

12. The vehicle as set forth in claim 11, wherein the floor is designed to lock a personal mobility device and the extension is designed to receive legs of an occupant of a personal mobility device.

13. An assembly comprising:
    a platform defining an occupant seating area;
    an airbag supported by the platform and inflatable toward the occupant seating area to an inflated position; and
    at least a portion of the airbag in the inflated position extending endlessly around the platform.

14. The assembly as set forth in claim 13, further comprising a seat fixed to the platform in the occupant seating area.

15. The assembly as set forth in claim 14, wherein the airbag is arranged in a generally circular shape around the seat on the platform in an uninflated position.

16. The assembly as set forth in claim 13, wherein the airbag includes a cavity receiving the occupant seating area in the inflated position, the airbag including an extension protruding from the cavity.

17. The assembly as set forth in claim 16, further comprising a seat fixed to the platform in the occupant seating area, the seat including a seat back and a seat bottom extending in a seat-forward direction from the seat back, the extension protruding in the seat-forward direction relative to the seat bottom.

18. The assembly as set forth in claim 17, wherein the extension extends in the seat-forward direction beyond the platform.

19. The assembly as set forth in claim 18, wherein the airbag includes tubes below the cavity extending from the platform to the extension.

20. The assembly as set forth in claim 16, wherein the platform is designed to lock a personal mobility device and the extension is designed to receive the legs of an occupant of a personal mobility device.

* * * * *